Patented Sept. 24, 1946

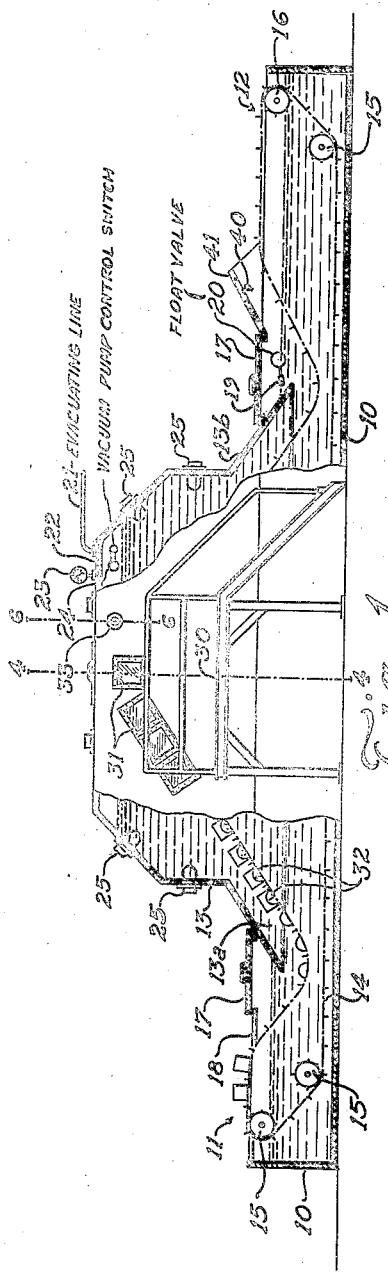

2,408,202

UNITED STATES PATENT OFFICE 2,408,202

APPARATUS FOR VACUUM TESTING SEALED ARTICLES

Robert H. Dickman, Evansville, Ind.

Application November 7, 1944, Serial No. 562,303

5 Claims. (Cl. 73—45)

1

The present invention relates to apparatus for testing sealed articles, for example metal containers, for leakage, and aims generally to improve both existing methods and apparatus for this purpose.

More particularly, the invention aims to provide a new and improved apparatus for testing sealed containers for leakage by moving the containers into a submerged, sub-atmospheric testing zone so that any air contained in a leaking or unsufficiently sealed container will be automatically evacuated, the escape of air from the leaky container providing a visible indicator of the insufficiently sealed condition of the container.

More particularly the invention aims to provide a simple apparatus for rapidly testing articles to the end that the process may be continuously performed and the vacuum testing of the articles kept in pace with the production of the article forming machine.

More specific aims and advantages of the invention will be apparent to persons skilled in the art from a consideration of the accompanying drawings and the annexed specification illustrating and describing a preferred embodiment of apparatus suitable for practicing the method.

In the drawings:

Fig. 1 is a longitudinal sectional view of an article testing machine embodying the invention according to one embodiment thereof, parts of the machine being shown in side elevation better to illustrate the construction;

Fig. 2 is a top plan view of the machine illustrated in Fig. 1;

Fig. 6 is a detail sectional view illustrating diagrammatically one form of article marking mechanism.

Figures 3, 4:
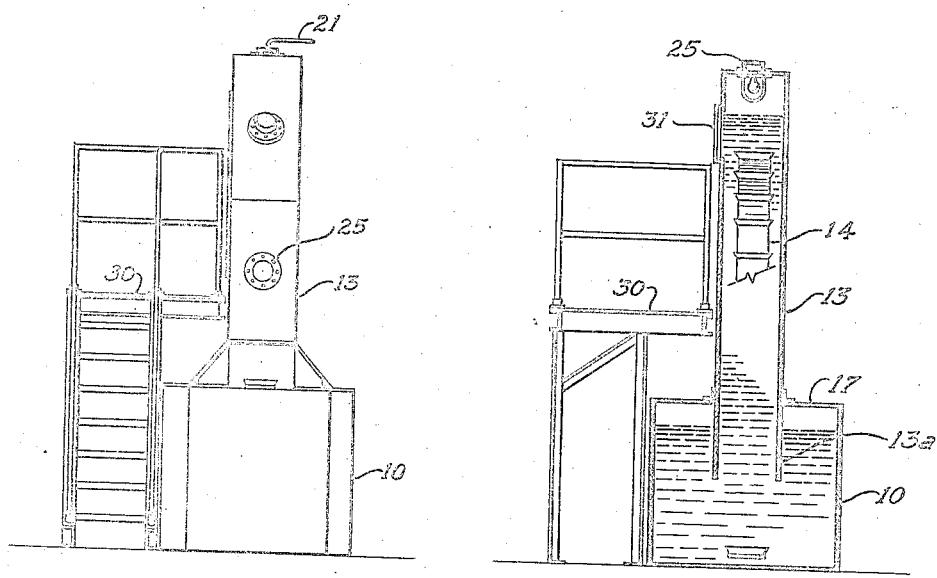
Fig. 3 is an end elevation thereof as viewed from the discharge end of the machine.
Fig. 4 is a transverse sectional view of the machine as taken on the line 4—4 of Fig. 1.

Referring more particularly to the drawings, there is illustrated in Figs. 1 to 4 inclusive, one desirable embodiment of a simply constructed machine embodying the invention and suitable for carrying out the method thereof.

In the illustrated embodiment of the invention, there is provided an elongated tank 10 having a charging end 11, a delivery end 12 and an intermediate elevated vacuum chamber 13. The

2 tank 10 is provided with conveyor means for conveying articles to be tested from the charging end 11 through the vacuum chamber 13 to the delivery end 12, and desirably this conveyor may be a suitable chain conveyor 14 trained over suitably placed idler pulleys 15 and a drive pulley 16. The idler pulley 15 adjacent the charging end of the tank may be adjustably mounted to provide an adjustable take-up for the conveyor, as will be understood.

The tank 10 is adapted to contain suitable liquid, such as water, in which the articles to be tested are submerged, the liquid at the charging end 11 and delivery end 12 being under normal atmospheric pressure, while the liquid in the intermediate chamber 13 is under sub-atmospheric pressure. Accordingly, the charging and discharge ends of the tank may be fitted with cover plates 17, slotted as at 18 for the passage of the cans or articles to and from the tank. The tank may be supplied with water or other liquid by suitable inlet 19 controlled by a suitable float-controlled valve 20 to maintain a predetermined liquid level in the tank 10, as will be well understood in the art.

The intermediate sub-atmospheric pressure chamber 13 is filled with water and has airtight, side, end and top walls and is disposed above the liquid elevel of the tank 10. The side walls 13$^a$ and end walls 13$^b$ of the chamber 13 are sealed to the top or cover 17 of the tank 10 and extend well below the water level of the tank 10 (Figs. 1 and 3) to provide a water seal between the chamber 13 and the adjoining atmospheric pressure charging and discharge sections 11 and 12.

Suitable means are provided for maintaining a partial vacuum or sub-atmospheric pressure in the chamber 13 and desirably such means may comprise an evacuating tube 21 connected to the top of the casing 13 by a suitable fitting 22 and fitted with a vacuum gauge 23, the tube 21 being connected to a suitable vacuum pump (not shown). The vacuum pump may be provided with the usual automatic controls for maintaining a predetermined sub-atmospheric pressure in the upper portion of the chamber 13, or the chamber 13 may be fitted with a float control switch 24 for controlling operation of the vacuum pump until a predetermined level of liquid is maintained in the sub-atmospheric chamber 13.

The chamber 13 is provided with means to illuminate the interior thereof and preferably such means comprise marine lamps 25 mounted in the end walls of the chamber and submerged in the liquid. Similar lamps may also be mounted in the top of the chamber to illuminate the vacuum chamber above the liquid level therein.

In practicing the invention according to the illustrated embodiment of apparatus, the tank 10 is filled with liquid, for example water, to a predetermined level as maintained by the float valve 20. The vacuum pump is started to create a partial vacuum in the chamber 13 which raises a body of liquid in the chamber 13 to a predetermined level as determined by the sub-atmospheric pressure in the chamber 13, or by the float switch 24. As will be apparent the height of the column of water in the chamber 13 is determined by the vacuum applied to the upper end of the chamber by the vacuum pump and the water is supported by vacuum of an equivalent number of inches of mercury. This balanced relation between the lower water level and atmospheric pressure in the charging and discharging sections and the higher water level and sub-atmospheric pressure in the testing chamber 13 is maintained by reason of the water seals between the chamber 13 and tank 10 as formed by the submerged lower ends of the side and end walls 13ª and 13ᵇ.

The cans or articles to be vacuum tested are fed upon the conveyor 14 at the charging station and are then submerged in the liquid of the tank 10 and moved under the water seal formed by the submerged portions of the testing chamber side and end walls 13ª and 13ᵇ.

The articles are then moved upwardly in the testing chamber 13 on the conveyor 14. As they reach a subatmospheric pressure testing zone in the upper submerged portion of the chamber, air from the interior of a leaky article will be evacuated from the article and escape through the liquid. This will be evidenced by air bubbles rising from the article or container through the liquid.

The above described leaky condition of the articles being tested may be observed by an attendant stationed on an inspector's platform 30 who may view the articles passing through the testing chamber through inspection windows 31 suitably placed and sealed in the sides thereof.

Segregation of the leaky or defective article from those successfully withstanding the test may be effected in a variety of ways. For example, successive sections or flights of the conveyor may be numbered or otherwise identified with indicating indicia 32 (see Fig. 1) so that the inspector may visually determine that the article on any particular numbered conveyor section is defective and advise an attendant at the take-off or discharge station, who will remove it from those articles passing inspection.

Alternately the testing chamber 13 may be provided with a suitable marking device of any approved construction and diagrammatically indicated at 33 (Fig. 1) which may comprise a stamp member 34 secured to a piston of a pneumatic cylinder 35 and manually operable by the attendant to mark the article as defective.

Figure 5:
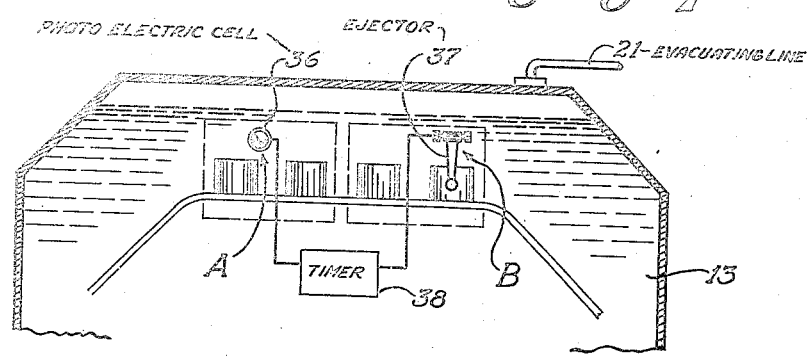
Fig. 5 is an enlarged detail sectional view illustrating diagrammatically one apparatus for automatically detecting and segregating leaky containers or articles.

Alternately, as illustrated in Fig. 5, the testing chamber 13 may be provided with a photoelectric cell 36 positioned above the path of the article at a position A, so as to be energized by the air bubbles rising from a defective or leaky article or can. The photoelectric cell may be electrically connected to an ejector member 37 through an electric timer, included at 38, to operate the ejector at position B to dislodge the leaky article from the conveyor 14. The articles thus dislodged from the conveyor may be removed from the chamber 13 or tank 10 by any suitable means, for example a suitable take-off conveyor (not shown).

The articles are continuously moved through the testing chamber by the conveyor 14 and are carried below the water seal between the testing chamber 13 and the discharge end 12 of the tank 10 and then raised to a take-off level, which may be at the level of the top of the tank 10. As the articles approach the discharge station 12 they may be subjected to an air blast from nozzles 40 within a hood 41 to remove water from and partially dry the articles that have been tested.

The apparatus herein described has proved particularly effective in vacuum testing canned products and like articles where a complete testing of all articles is required at a speed comparable to the speed of the forming or packaging machine on which the articles are produced. Though the machine illustrated has been designed primarily for the vacuum testing of sealed canned products, it is applicable to the vacuum testing of other articles, for example refrigeration units, steam coils, compression units, tank floats and like articles which must be of airtight construction. In cases where the articles being tested are of less specific gravity than water, the conveyor sections may be provided with suitable clamps (not shown) for securing the articles thereto.

The invention is not to be restricted to the embodiment thereof shown and described which is intended for illustrative purposes only, but includes as well such equivalent devices as may be included within the terms of the appended claims.

I claim:

1. Apparatus for vacuum-testing sealed articles for leakage, comprising an elongated liquid-containing tank, having an elevated intermediate portion which is hermetically sealed to the main tank by a water seal and which constitutes a testing chamber, means for applying a partial vacuum in said testing chamber to raise the liquid therein to a level above the level in said tank and means for moving articles successively from said tank into said elevated testing chamber and then back into said tank.

2. Apparatus for vacuum-testing sealed articles for leakage, comprising a liquid-containing tank having an intermediate elevated chamber constituting a testing chamber, means for maintaining a predetermined liquid level in said tank, said testing chamber provided with a depending apron extending below the predetermined liquid level in said tank, means for applying a partial vacuum in said testing chamber to raise the liquid therein to a level above the liquid level of said tank and to create a zone of sub-atmospheric pressure near the surface thereof, and means for progressively moving articles to be tested through said liquid from the surface thereof in said tank to an elevated submerged position in the zone of sub-atmospheric pressure in said testing chamber.

3. Apparatus for vacuum-testing sealed articles for leakage comprising a liquid-containing tank having an elevated intermediate portion which is hermetically sealed to the main tank by a water seal and which constitutes a testing chamber, means for creating a partial vacuum in said testing chamber to raise the liquid therein to a level above the liquid level in said tank, means for progressively moving articles to be tested from said tank to an elevated submerged position of sub-atmospheric pressure in said testing chamber, at least one wall of said chamber being provided with windows permitting visible inspection of said articles in said chamber.

4. Apparatus for vacuum-testing sealed articles for leakage comprising a liquid-containing tank having an elevated intermediate portion which is hermetically sealed to the main tank by a water seal and which constitutes a testing chamber, means for creating a partial vacuum in said testing chamber to raise the liquid therein to a level above the liquid level in said tank, means for maintaining the liquid in said chamber at a predetermined level, and means for progressively moving articles to be tested from said tank to an elevated submerged position of sub-atmospheric pressure in said testing chamber.

5. Apparatus for vacuum-testing sealed articles for leakage comprising an elongated liquid-containing tank having exposed surfaced article charging and discharging positions and having an elevated intermediate portion which is hermetically sealed to the main tank by a water seal and which constitutes a testing chamber, means for applying a partial vacuum in said testing chamber to raise the liquid therein to a level above the liquid level in said tank and to create a submerged zone of sub-atmospheric pressure capable of evacuating air from a leaky container to cause the air to bubble through the liquid at said zone, means for progressively moving articles from said charging position through the submerged testing zone and thence to said discharging position, and automatic means operable by the presence of air bubbles from a leaky article to engage said leaky article and identify it from other articles passing said test.

ROBERT H. DICKMAN.